United States Patent
Rowlan

(10) Patent No.: US 8,912,504 B2
(45) Date of Patent: Dec. 16, 2014

(54) CENTRALIZED DETECTION OF RADIATION IN MULTIPLE FACILITIES

(71) Applicant: Nucor Corporation, Charlotte, NC (US)

(72) Inventor: Steve Rowlan, Matthews, NC (US)

(73) Assignee: Nucor Corporation, Charlotte, NC (US)

( * ) Notice: Subject to any disclaimer, the term of this patent is extended or adjusted under 35 U.S.C. 154(b) by 186 days.

(21) Appl. No.: 13/674,619

(22) Filed: Nov. 12, 2012

(65) Prior Publication Data

US 2013/0085788 A1    Apr. 4, 2013

Related U.S. Application Data

(63) Continuation-in-part of application No. PCT/US2011/035827, filed on May 10, 2011.

(60) Provisional application No. 61/332,996, filed on May 10, 2010.

(51) Int. Cl.
*G01T 7/00* (2006.01)
*G06Q 10/06* (2012.01)

(52) U.S. Cl.
CPC . *G06Q 10/06* (2013.01); *G01T 7/00* (2013.01)
USPC .......................................... 250/394; 250/395

(58) Field of Classification Search
USPC ....................................... 250/336.1, 394, 395
See application file for complete search history.

(56) References Cited

U.S. PATENT DOCUMENTS

| | | | |
|---|---|---|---|
| 3,508,047 A | 4/1970 | Mott et al. | |
| 4,521,645 A | 6/1985 | Carroll | |
| 4,535,243 A | 8/1985 | Peschmann | |
| 4,585,941 A | 4/1986 | Bergner | |
| 4,598,202 A | 7/1986 | Koechner | |
| 4,788,436 A | 11/1988 | Koechner | |
| 4,800,384 A | 1/1989 | Snijders | |
| 4,843,462 A | 6/1989 | Roy et al. | |
| 4,862,004 A | 8/1989 | Koike et al. | |
| 4,864,139 A | 9/1989 | Phillips | |
| H810 H | 8/1990 | Wilkinson | |
| 4,959,547 A | 9/1990 | Carroll et al. | |
| 5,015,861 A | 5/1991 | Derenzo et al. | |
| 5,038,318 A | 8/1991 | Roseman | |
| 5,109,227 A | 4/1992 | Godfrey | |
| 5,264,702 A | 11/1993 | Mihalczo | |
| 5,274,311 A | 12/1993 | Littlejohn et al. | |
| 5,276,813 A | 1/1994 | Elliott et al. | |
| 5,283,781 A | 2/1994 | Buda et al. | |
| 5,298,756 A | 3/1994 | McCollum et al. | |

(Continued)

FOREIGN PATENT DOCUMENTS

EP    0493545    11/1996

*Primary Examiner* — Mark R Gaworecki
(74) *Attorney, Agent, or Firm* — Hahn Loeser & Parks LLP; Arland T. Stein

(57) ABSTRACT

A central system of monitoring radiation levels in a plurality of facilities at the same time is disclosed. The system may include radiation detection systems, at least one processor to process monitoring data generated by the radiation detection systems to compensate for naturally occurring radiation, and a central monitoring station capable of generating an alarm at the central monitoring station and at a facility where an undesired radiation level has been detected. A method of monitoring radiation levels in production facilities is also disclosed. The method may include providing a plurality of radiation detection systems, providing a central monitor in communication with the radiation detection systems, communicating data from the radiation detection systems to the central monitor, and analyzing the data to detect potential radioactive materials.

60 Claims, 9 Drawing Sheets

(56) References Cited

U.S. PATENT DOCUMENTS

| | | |
|---|---|---|
| 5,382,943 A | 1/1995 | Tanaka |
| 5,416,330 A | 5/1995 | Abul-Faraj et al. |
| 5,557,108 A | 9/1996 | Tumer |
| 5,679,956 A | 10/1997 | Johnston |
| 5,705,818 A | 1/1998 | Kelbel et al. |
| 5,771,511 A | 6/1998 | Kummer et al. |
| 5,959,529 A | 9/1999 | Kail, IV |
| 5,974,111 A | 10/1999 | Krug et al. |
| 6,215,404 B1 | 4/2001 | Morales |
| 6,246,355 B1 | 6/2001 | Micheli et al. |
| 6,262,550 B1 | 7/2001 | Kliman et al. |
| 6,362,725 B1 | 3/2002 | Ulrich et al. |
| 6,366,328 B1 | 4/2002 | Vanderpohl, III et al. |
| 6,484,050 B1 | 11/2002 | Carroll et al. |
| 6,529,128 B2 | 3/2003 | Weng |
| 6,727,506 B2 | 4/2004 | Mallette |
| 6,839,661 B2 | 1/2005 | Costa et al. |
| 7,043,237 B2 | 5/2006 | Snyder et al. |
| 7,045,788 B2 | 5/2006 | Iwatschenko-Borho et al. |
| 7,107,287 B2 | 9/2006 | Gillespie et al. |
| 7,148,483 B1 | 12/2006 | Testardi |
| 7,315,535 B2 | 1/2008 | Schuman |
| 7,375,334 B2 | 5/2008 | Smith et al. |
| 7,428,419 B2 | 9/2008 | Wetzel et al. |
| 7,526,944 B2 | 5/2009 | Sabata et al. |
| 7,610,210 B2 | 10/2009 | Helitzer et al. |
| 2002/0056501 A1 | 5/2002 | Bingel, III et al. |
| 2003/0067648 A1 | 4/2003 | Antosik et al. |
| 2004/0037394 A1 | 2/2004 | Kuroda et al. |
| 2005/0131656 A1 | 6/2005 | Ikeda et al. |
| 2007/0096037 A1 | 5/2007 | Shapiro et al. |
| 2007/0239408 A1 | 10/2007 | Manges et al. |
| 2008/0157986 A1 | 7/2008 | Proctor et al. |
| 2008/0258880 A1 | 10/2008 | Smith et al. |
| 2009/0101830 A1 | 4/2009 | Craig et al. |
| 2009/0178139 A1 | 7/2009 | Stute et al. |
| 2010/0046690 A1 | 2/2010 | Proctor et al. |

| Site | Alarm Accept Rate | System Risk Rating | Speed Alarms | Total Gamma Alarms | Test Alarms | KO61 Alarms | Non-Scrap Alarms | Scrap Alarms | Unknown Alarms | Scrap Alarm Accepted | Scrap Alarm Rejected |
|---|---|---|---|---|---|---|---|---|---|---|---|
| Location #1 | 0% | Improve | 13 | 45 | 0 | 0 | 36 | 6 | 3 | 0 | 6 |
| Location #2 | 100% | Improve | 37 | 127 | 0 | 9 | 117 | 1 | 0 | 1 | 0 |
| Location #3 | 14% | Marginal | 12 | 82 | 1 | 10 | 64 | 7 | 0 | 1 | 6 |
| Location #4 | 100% | Marginal | 63 | 47 | 12 | 3 | 31 | 1 | 0 | 1 | 0 |
| Location #5 | 25% | Improve | 649 | 83 | 0 | 4 | 43 | 36 | 0 | 9 | 27 |
| Location #6 | 50% | Satisfactory | 12 | 60 | 18 | 1 | 37 | 4 | 0 | 2 | 2 |
| Location #7 | 25% | Improve | 0 | 48 | 0 | 0 | 44 | 4 | 0 | 1 | 3 |
| Location #8 | 29% | Satisfactory | 0 | 122 | 51 | 2 | 52 | 17 | 0 | 5 | 12 |
| Location #9 | 100% | Marginal | 14 | 144 | 103 | 6 | 30 | 5 | 0 | 5 | 0 |
| Location #10 | 50% | Satisfactory | 0 | 68 | 7 | 5 | 48 | 8 | 0 | 4 | 4 |
| Location #11 | 100% | Marginal | 12 | 153 | 28 | 2 | 122 | 1 | 0 | 1 | 0 |
| Location #12 | 100% | Improve | 6 | 40 | 10 | 7 | 19 | 3 | 1 | 3 | 0 |
| Location #13 | 0% | Improve | 186 | 64 | 0 | 0 | 63 | 1 | 0 | 0 | 1 |
| Location #14 | 78% | Improve | 0 | 354 | 0 | 0 | 345 | 9 | 0 | 7 | 2 |
| Location #15 | 63% | Improve | 0 | 156 | 0 | 58 | 90 | 8 | 0 | 5 | 3 |
| Location #16 | 0% | Marginal | 0 | 8 | 3 | 0 | 5 | 0 | 0 | 0 | 0 |
| Location #17 | 0% | Marginal | 6 | 81 | 3 | 1 | 77 | 0 | 0 | 0 | 0 |
| Location #18 | 100% | Marginal | 13 | 136 | 117 | 0 | 18 | 1 | 0 | 1 | 0 |

| Total Alarms All Locations | 41% | | 1023 | 1818 | 353 | 108 | 1241 | 112 | 4 | 46 | 66 |

FIG. 9

| Site: | Portal: | Total Occupancies: | Corrected Occ. Total (In/Out): | Gamma Scrap: | % Occupancies to Scrap Alarms: | Percent Degredation/ System: |
|---|---|---|---|---|---|---|
| Location #1 | East Gate | 2578 | 1289 | 0 | 0.00% | ≤ 1% |
| Location #1 | Front Gate In | 3016 | 1508 | 0 | 0.00% | ≤ 1% |
| Location #1 | Front Gate Out | 2494 | 1247 | 0 | 0.00% | ≤ 1% |
| Location #1 | North Rail | 6901 | 3451 | 1 | 0.03% | ≤ 1% |
| Location #1 | South Rail | 3832 | 1916 | 0 | 0.00% | ≤ 1% |
| Location #2 | T_Scale | 10983 | 5492 | 3 | 0.05% | ≤ 1% |
| Location #3 | E_Scale | 990 | 495 | 0 | 0.00% | ≤ 1% |
| Location #3 | Rail | 2498 | 1249 | 0 | 0.00% | ≤ 1% |
| Location #3 | T_Scale | 8483 | 4242 | 0 | 0.00% | ≤ 1% |
| Location #3 | W_Scale | 4836 | 2418 | 0 | 0.00% | ≤ 1% |
| Location #4 | RAIL | 2485 | 1243 | 1 | 0.08% | ≤ 1% |
| Location #5 | TRUCK | 7973 | 3987 | 6 | 0.15% | ≤ 1% |

FIG. 10

CENTRALIZED DETECTION OF RADIATION IN MULTIPLE FACILITIES

CROSS-REFERENCE TO RELATED APPLICATIONS

This application is a continuation-in-part of International Application No. PCT/US2011/035827 filed May 10, 2011, which claims priority to U.S. Provisional Patent Application No. 61/332,996 filed May 10, 2010, the disclosures of which are incorporated herein by reference.

BACKGROUND AND SUMMARY OF DISCLOSURE

The present disclosure relates to detecting radiation, and more particularly, to centralized detection and monitoring for low-level radioactive material in a number of facilities, such as steelmaking facilities, at the same time.

In production facilities such as those that produce metal products, radioactive material can present a difficulty that can have far reaching impact. For example, radioactive materials can come into a steelmaking process through the scrap that is prominently used in making steel by electric arc furnace (EAF). The charge for making steel in an EAF is typically 50% to 70%, or more, steel scrap collected through junk yards and scrap dealers. The steel scrap is often shredded and transported to a steelmaking facility. The steel scrap has originated from a wide variety of sources including radioactive sources such as medical equipment. There is the potential for radioactive scrap to reach the steel melt and be integrated into the steel product produced if not screened out. The same circumstance is encountered in foundries, aluminum production and other production facilities where recycled metal is utilized. The radioactive material disrupts the production operation while the radioactive material is removed from the furnace, the baghouse, and/or other production facility that may have been contaminated. The introduction of radioactive material also presents the potential for recalls of the product produced by the facility.

In steelmaking, in the past, it has been common practice to detect radioactive contaminates in scrap loads in trucks, railroad cars, barges and other containers delivering scrap to a steelmaking facility. See, e.g., U.S. Pat. Nos. 5,679,956, 5,705,818, and 6,727,506. These systems can also be used in introducing other recycled material to other production facilities (e.g., aluminum production). These radiation monitoring systems detect radioactive material as the scrap load in the truck, railroad car or other vehicle passes adjacent a radiation detector. One problem is that low-level radioactive material buried within the scrap load is difficult to detect even under typical conditions. Certain radioactive materials such as cobalt, cesium, and radium are common materials that potentially could be found in scrap or other recycled material. Further complicating the matter for steelmaking, certain scrap materials such as hot water heaters contain calcium carbonate which may contain radium. In any case, background radiation from naturally occurring radioactive material (NORM) increases the difficulty of detecting low-level radioactive material in scrap and other recycled material. Complicating the matter further for some facilities such as steelmaking and other metal production operations, certain materials used in the production, such as refractories, can contain thorium, radium and similar naturally occurring radioactive material that may be permitted to enter the production facility.

If a load of scrap or other recycled material is determined to contain an undesired radiation source, the load can be rejected incurring additional costs and delay in the delivery of scrap or other recycled material to the production facility. The rejected load can be searched at the production facility to identify and remove the radiation source from the scrap or recycled load, or the load can be returned to the provider. Cost effective detection is therefore sought for the safe and efficient operation of the production facility. With available radiation detecting systems, when radioactive material is detected in a load of scrap or other recycled material in some facilities, a practice may be followed to retest the load by passing the load by the radiation detector up to three times. If the load passes the detection two out of three times, the load may be deemed safe and permitted to enter the production facility.

The effectiveness of current radiation detection systems is dependent on the configuration and detection or alarm levels of the detection system, as well as on the procedures followed by the local radiation safety officer (LRSO) on duty in interpreting detection data. As a result, the radiation detection systems operation may vary with each installation and even with each LRSO on duty at a given installation.

In addition to detection systems used at the railroad portal or truck gates to screen incoming scrap or other recycled material, other radiation detection systems often with varying configurations and different detection levels may be used in the clam shell or conveyer used to load scrap or other material to the furnace ladle or other processing container, in detection of radioactive material in molten samples taken at different points in the production process, and in the detection of radioactive material in bag houses and other particulate collection systems.

The various radiation detection systems used throughout steelmaking and other production facilities were typically checked and tested periodically to insure continued operation and detection capability. The processes and procedures used to test the detection systems usually involve presenting a known radiation source to the radiation detector and verifying that an alarm or alert was generated. These testing methods demonstrated functionality at the time of the test, but may not identify other problems with the radiation detection systems during operation. The operating status of the radiation detection systems was not often known between testing intervals presenting the possibility for radioactive material to enter and be processed in the production facility during times when a radiation detection system was partially or whole inoperative.

There has been a need for a centralized radiation safety officer (CRSO) to monitor all of the production facilities in a network of faculties. The centralized radiation detection system would provide standardized radiation detection at all points within a production facility and provide standardized radiation detection at a number of different production facilities that may be located at widely dispersed geographic locations. It was also needed that the centralized radiation detection system would be able to permit a CRSO to coordinate with an LRSO to provide and maintain substantially uniformly radiation detection. There was also a need to be able to centrally review the radiation detection data from all production facilities in a network to identify recurring sources from which radioactive scrap or other recycled material has been originating for remediation. It was also desired that the radiation system can be expanded to detection of radioactive scrap by scrap or recycle dealers prior to shipment to the production facility.

Further, the radiation detection system may be substantially improved by the CRSO being an independent company that provides insurance to the operator of the production facilities to mitigate losses associated with contamination by radioactive material going undetected in the production facility. This provides the CRSO with incentive and motivation to maintain the same safe level of detection of radioactive material throughout the production facilities in a network.

A central system of monitoring radiation levels in a plurality of facilities at the same time is presently disclosed. The system may comprise a plurality of radiation detection systems capable of detecting radiation levels in recycled material positioned at a plurality of locations through a network of facilities, at least one processor to process monitoring data generated by each radiation detection system to compensate for naturally occurring radiation, a central monitoring station capable of receiving data from the processor and identifying radioactive material in the recycled material at each radiation detection system, and the central monitoring station capable of generating an alarm at the central monitoring station and at the facility involved where an undesired radiation level has been recorded by at least one radiation detection system.

A central system of monitoring radiation levels in a plurality of steelmaking facilities at the same time is also disclosed comprising a plurality of radiation detection systems capable of detecting radiation levels in scrap loads positioned at a plurality of locations through a network of steelmaking facilities, at least one processor to process monitoring data generated by each radiation detection system to compensate for naturally created radiation, a central monitoring station capable of receiving data from the processor identifying radioactive material in scrap loads at each radiation detection system, and the central monitoring station capable of triggering an alarm both at the central monitoring station and at the steelmaking facility involved where an undesired radiation level has been recorded by at least one radiation detection system. The processor identifying radioactive material in the scrap load may be located as part of each location detection system, at a central or segmented servers in the steelmaking facilities, or as part of the central monitoring station.

A system of monitoring radiation levels in multiple steelmaking facilities is also disclosed comprising a plurality of radiation detection systems positioned at a plurality of locations through a plurality of steelmaking facilities capable of detecting radiation levels of potential low-level radiation sources in steelmaking material, a central monitoring station in communication with the plurality of radiation detection systems capable of receiving data from the radiation detection systems corresponding to radiation levels, and the radiation detection systems capable of triggering an alarm both at the central monitoring station and at the steelmaking facility where an undesired radiation level as been recorded by at least one of the radiation detection systems.

A method of monitoring radiation levels in production facilities is also disclosed that includes detecting radiation levels in recycled material at desired locations through a plurality of production facilities by a plurality of radiation detection systems, communicating data corresponding to detected radiation levels from the radiation detection systems to a central monitor, analyzing the data from the radiation detection systems to determine the nature of a potential radiation source, disposing of material containing potential radiation sources according to instructions provided from the central monitor based upon the analysis of the data communicated from the radiation detection systems. The method may also include monitoring the operation of the plurality of radiation detection systems from the central monitor and signaling the facility when a radiation detection system requires maintenance.

The method of monitoring radiation levels in production facilities may also include calculating a probability that a potential radiation source will escape detection and contaminate a production facility, calculating an estimated cost for remediation of a contaminated production facility, and providing an insurance policy to compensate the production facility for at least a portion of the cost of remediation.

A method of monitoring radiation levels in steelmaking facilities may comprise a plurality of radiation detection systems capable of detecting radiation levels in steelmaking material positioned at desired locations through a plurality of steelmaking facilities, providing a central monitor in communication with the plurality of radiation detection systems, analyzing the data from the radiation detection systems to determine the nature of a potential radiation source in the steelmaking material, communicating data from the radiation detection systems to the central monitor corresponding to detected radiation levels, disposing of the steelmaking material containing potential radiation sources according to instructions provided from the central monitor based upon the analysis of the data from the radiation detection systems, and monitoring the operation of the plurality of radiation detection systems from the central monitor and signaling the facility when a radiation detection system requires maintenance.

BRIEF DESCRIPTION OF THE DRAWINGS

FIG. 9 is an exemplary summary report for multiple facilities.

FIG. 10 is an exemplary report for multiple detectors at multiple facilities.

DETAILED DESCRIPTION OF THE DRAWINGS

Referring generally to FIGS. 1 through 8, a central system of monitoring radiation levels in a plurality of facilities at the same time is disclosed. The system may comprise a plurality of radiation detection systems capable of detecting radiation levels in recycled material positioned at a plurality of locations through a plurality of facilities. The system may also comprise a processor to process monitoring data generated by each radiation detection system to compensate for naturally occurring radiation and a central monitoring station capable of receiving data from a processor identifying radioactive material in the recycled material at each radiation detection system. The processor identifying radioactive material in the scrap load may be located as part of each location detection system, at a central or segmented servers in the steelmaking facilities, or as part of the central monitoring station.

The central monitoring station may also be capable of generating an alarm at the central monitoring station and at the facility where an undesired radiation level has been recorded by at least one radiation detection system. Alarms may be radiation or gamma alarms generated when a measured radiation level is determined to represent an undesired radiation level or radiation source that should be excluded from the facility. Alarms may also be generated to indicate excessive or unexpected levels of radiation from naturally occurring radioactive materials or background radiation (NORM alarms). The central monitoring station may also be able to identify false alarms such as in circumstances where a radiation alarm was generated but ultimately determined not to represent an undesired radiation source. Speed alarms may also be generated by the radiation detection system or central monitoring station if a load of recycled material is moved too quickly past a radiation detector for the radiation detector to make an accurate reading.

Figure 8:
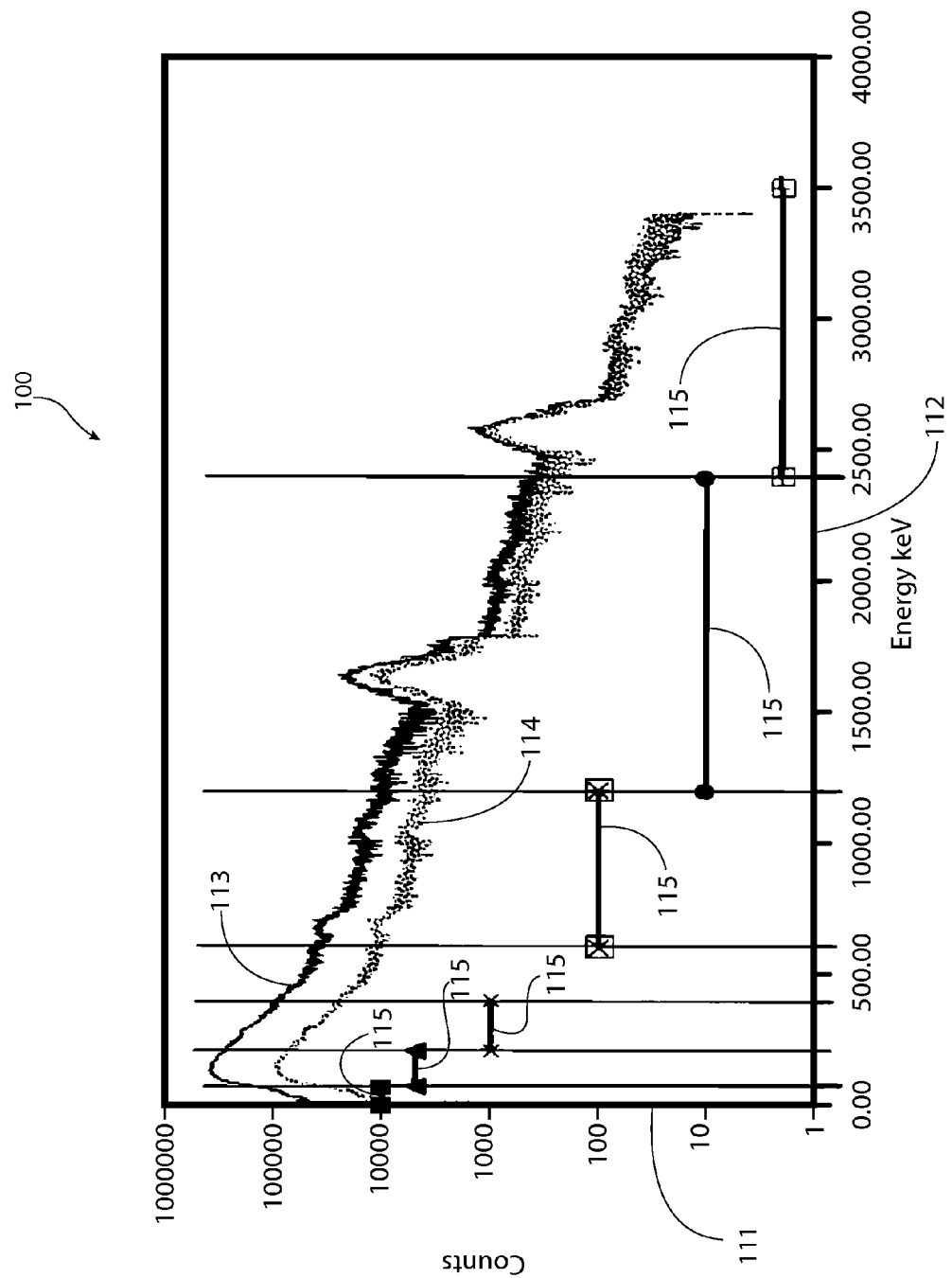
FIG. 8 is another illustrative energy spectrum.

As will be described in greater detail below, the central system of monitoring radiation may include radiation detectors such as scintillation detectors capable of counting radiation incidents in an energy spectrum. The processor may analyze the monitoring data from each detector by dividing the energy spectrum into increments or segments 115, as shown in FIG. 8, corresponding to the energy levels of potential radioactive materials. The processor may also analyze the monitoring data by segregating a measured energy spectrum into increments and normalizing each increment based on the difference in counts between increments. The processor may be further capable of processing the monitoring data generated by each radiation detector system to compensate for variation in the depth of the recycled material in containers passing the detector. One or more processors may be provided to process the monitoring data from one or more radiation detectors as desired for a given installation.

The central monitoring station may be further capable of monitoring the radiation detection systems for proper operation of the radiation detection systems, including the radiation detectors. The central monitoring station may also be capable of interrogating the radiation detection systems or polling the radiation detection system systems for diagnostic information. Alternatively or in addition, the radiation detection systems may be capable of continuously or periodically reporting an operating status to the central monitoring system. The reporting and receiving of diagnostic information relating to the proper operation of the radiation detection systems may provide a system heartbeat and ensure substantially continuous monitoring of the operating health of the system. The central monitoring system may also be capable of performing diagnostic tests on the radiation detection systems, and may be capable of correcting or remotely addressing errors in the systems. The configuration of the radiation detection system may also be remotely set by the central monitoring system in some examples, and the central monitoring system may be further capable of setting threshold radiation levels for detection of each radiation detection system deployed in a production facility. The central monitoring station may also be adapted to selectively aggregate and analyze data from different radiation detectors and detector systems.

Figure 1:
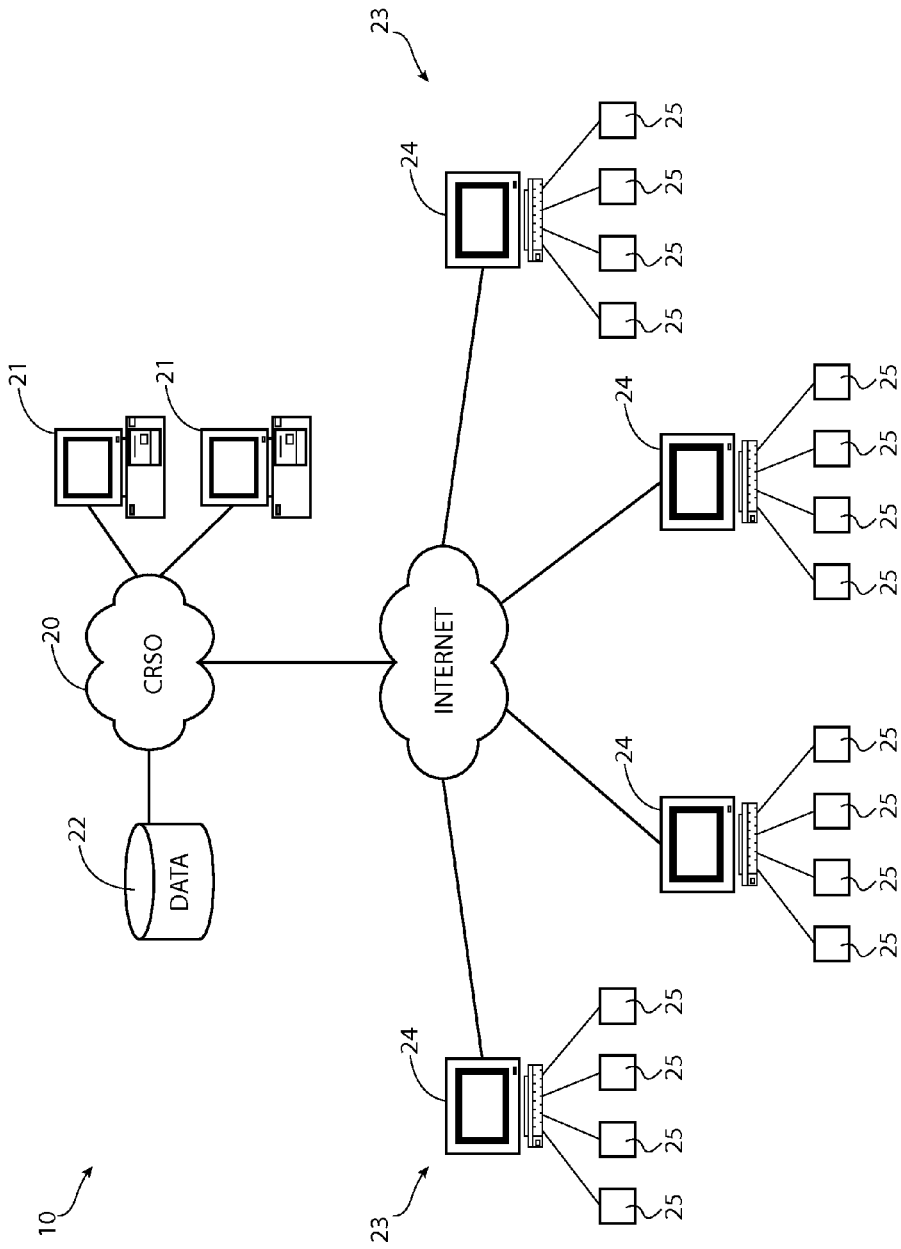
FIG. 1 is a schematic view of a system of the present disclosure.

Referring now to FIG. 1, a schematic diagram of a central system for monitoring radiation levels is illustrated. The system 10 may comprise a central monitoring station 20 in communication with a plurality of operating facilities 23, such as steelmaking facilities. The facilities may contain one or more processors 24 in communication with a plurality of radiation detection systems 25. As illustrated, each facility 23 is shown with a single processor 24 in communication with a plurality of radiation detection systems 25; however other configurations are contemplated. The facility 23 may communicate with the central monitoring station 20 through the internet. Alternatively, a dedicated communication link may be provided between the facilities 23 and the central monitoring station 20

The central monitoring station 20 receives monitoring data from the radiation detection systems 25 deployed in the facilities 23. The central monitoring station may also generate alarms based upon the received data. The central monitoring station 20 may include one or more central processors 21 each capable of receiving and analyzing the data from facilities 23. The received data may be stored in a database 22 or other data storage system for subsequent processing and analysis.

The central system of monitoring radiation may be employed in a wide range of production facilities, such as steelmaking facilities, aluminum production facilities, and scrap metal processors. The centralized monitoring and control of the radiation detection system provides standardized processes and high reliability of detection of low level radioactive materials.

The central system for monitoring radiation may be used in a variety of ways. In one example, monitoring radiation levels in a plurality of facilities may be performed by providing a plurality of radiation detection systems at a plurality of locations capable of detecting radiation levels in potential radiation sources and providing a central monitor in communication with the plurality of radiation detection systems, including one or more radiation detectors. The radiation detectors may be operated to detect radiation incident upon the radiation detectors and an alarm may be triggered when processed data from a radiation detection system indicates an undesired radiation level in a potential radiation source. Additionally, the data from the radiation detectors may be analyzed by the processor at the radiation detection system or at the central monitor to determine the nature of the potential radiation source. In any event, the potential radiation source may be disposed according to instructions provided from the central monitor to the facility based upon the analysis of the data from the radiation detector system. In an embodiment, after an alarm is generated for a given load of scrap or other material, the acceptance of that material may require an authorization token from the central monitor after review and approval of the data by the central monitor. The operation of the plurality of radiation detectors may also be monitored from the central monitor and the facility alerted when a radiation detector requires maintenance or other service.

The central system of monitoring radiation may include a plurality of radiation detection systems. Numerous radiation detection systems are commercially available and may be selected as appropriate for a given application. In one example, the radiation detector systems may be scintillation detectors or scintillation counters. Scintillation detectors may comprise a material capable of absorbing energy from radiation incident upon the detector and producing a flash of light corresponding to the incident radiation. Often scintillation detectors include one or more electronic light sensors, such as a photodiode, to detect the light produced by the detector corresponding to the incident radiation. The number of flashes produced by the scintillating material corresponds to the intensity of the radiation incident upon the detector and may be counted by the radiation detector over a predetermined period of time. As such, many radiation detectors measure and report radiation intensity in counts over a specified unit of time. To produce reliable results, an extended exposure time of several seconds may be required for some detectors; however other radiation detectors and detection systems may be employed such as that disclosed in U.S. Pat. No. 6,727,506. As will be apparent, radiation detectors may be selected for a variety of operating environments and conditions within the scope of the present disclosure.

Radiation detectors may detect both the intensity of radiation as well as the energy level of radiation incident upon the detector. Both naturally occurring and production-produced radioactive materials emit radiation having distinct energy levels that may be measured to determine the source of the radiation. For example, Cobalt-60 is a radioactive isotope that emits radiation having energy levels of 1.17 MeV and 1.33 MeV. In scintillation detectors, the intensity of the flashes of light produced corresponds to the energy level of the incident radiation allowing the detector to identify and record both the presence of radiation and radionuclide identification of the incident radiation.

Other types of radiation detection systems may also be employed for use with the central system for monitoring radiation, and multiple types of detectors may be employed throughout a system as desired. For example, Geiger counters, ionization chambers, proportional counters, semiconductor diode detectors, and dosimeters are other forms of radiation detectors that may be adapted for use with a radiation detection system. The various types of radiation detectors may be adapted to detect and report a measure of radiation incident upon the detector to a processor and a central monitoring station such that radioactive material may be detected and identified.

Figure 7:
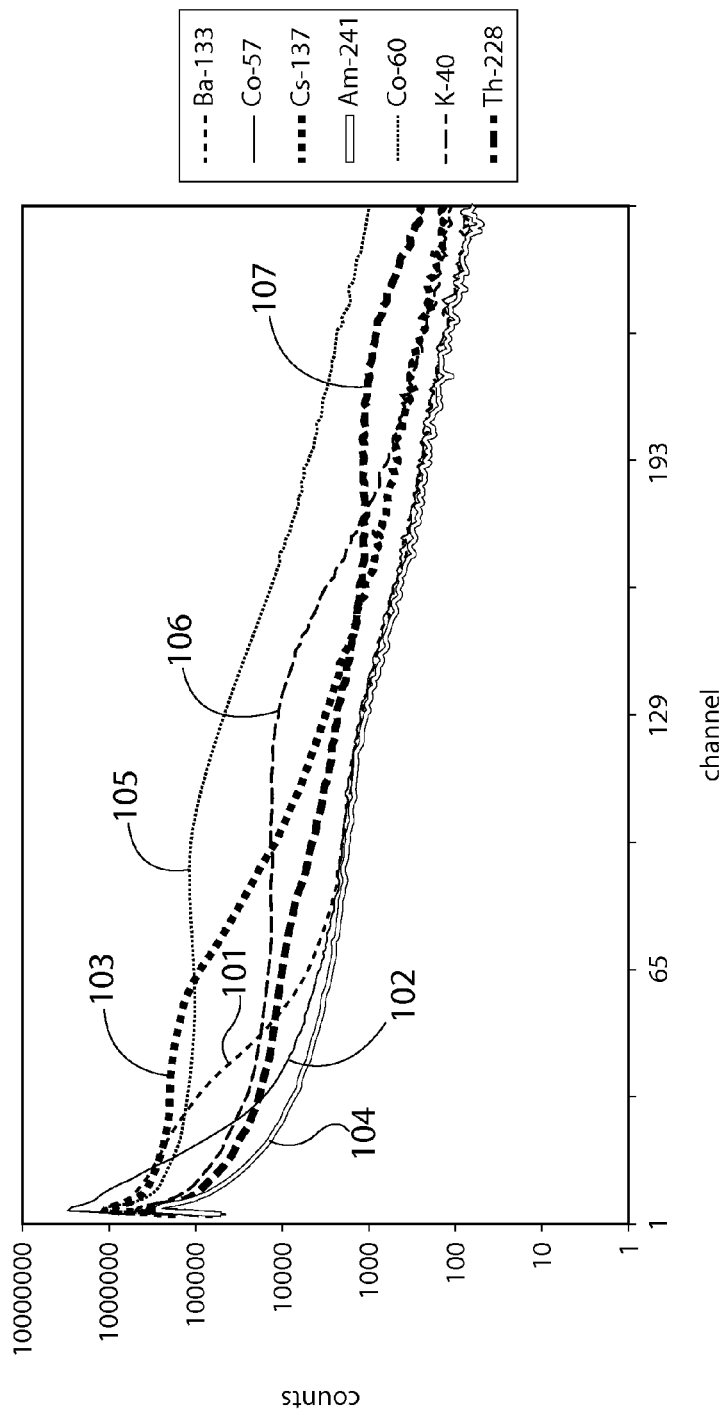
FIG. 7 is an illustrative energy spectrum of various radioactive isotopes.

The radiation detection systems may generate monitoring data corresponding to radiation incident upon the detectors. The monitoring data may include a measure of the intensity of radiation, such as the number of counts per minute. The monitoring data may also include a measure of the energy level of the radiation. In one example, the radiation detector may produce a histogram of counts in each of several defined energy bands. The energy bands in such a histogram or radiation spectrum may be selected to correspond to points of interest in the energy spectrum, such as corresponding to specific radioactive materials expected to be encountered by the radiation detectors. Referring to FIG. 7, the measured radiation from several radioactive elements are presented for purposes of illustration. The counts measured by a radiation detection system for different radioactive elements are illustrated for 256 channels of a histogram corresponding to portions of an energy spectrum. As illustrated, each radioactive element produces a different spectrum as shown by the lines of the graph in FIG. 7. The elements and corresponding spectrum lines are: Ba-133, line 101; Co-57, line 102; Cs-137, line 103; Am-241, line 104; Co-60, line 105; K-40, line 106, and Th-228, line 107. In some implementations, measured radiation from naturally occurring radioactive materials such as potassium K-40 may be used to verify proper calibration of the radiation detection systems by identifying shifts or errors in the calibration of the energy spectrum. Additionally, the potassium response may be monitored and used to calibrate the instruments of the radiation detector systems. In some embodiments, a method of monitoring a radiation detection system may include measuring radiation corresponding to K-40 and storing the measured data as baseline K-40 data. Subsequent to creating the baseline K-40 data, the radiation corresponding to K-40 may be measured on a continuous or periodic basis and compared to the stored K-40 data. As previously noted, potassium K-40 may be a naturally occurring radioactive material and it may be expected that the potassium response as represented by the measured K-40 data would remain constant over time. A difference between the measured K-40 data and the baseline K-40 data may indicate a change in the performance of the radiation detection system, and such change in performance may warrant further investigation to identify the source of the change so that maintenance or repair may be performed as needed. In some embodiments, traditional statistical process control techniques may be applied to the periodically or continuously measured K-40 data to detect shifts or fluctuations in the measured data.

The radiation detection system communicates monitoring data corresponding to the incident radiation to a processor to process the monitoring data. A processor may be capable of receiving and processing monitoring data from multiple radiation detectors, such as from all radiation detectors at a given facility or location. Alternatively, each radiation detector system may communicate with a discrete processor or the processor may be integrated with the radiation detection system operating in real time with the detection of the radiation. In any case, the processor may process the monitoring data collected by the radiation detector system to assess the presence of radioactive materials. The processor may be a general purpose computer in communication with one or more radiation detector systems and configured with software adapted to analyze the monitoring data. Alternatively, the processor may comprise dedicated firmware or software integrated with the radiation detector systems.

The processor will generally be configured to process and detect radioactive materials. In one example, the processor may be adapted to identify low level radioactive material having concentrations of beta and gamma emitters greater than 15 pCi/g (picocuries per gram). Conventional signal processing techniques such as averaging and filtering may be employed to reduce or adjust for background radiation and other undesired noise or characteristics of the monitoring data presented to the processor.

Figure 6A:
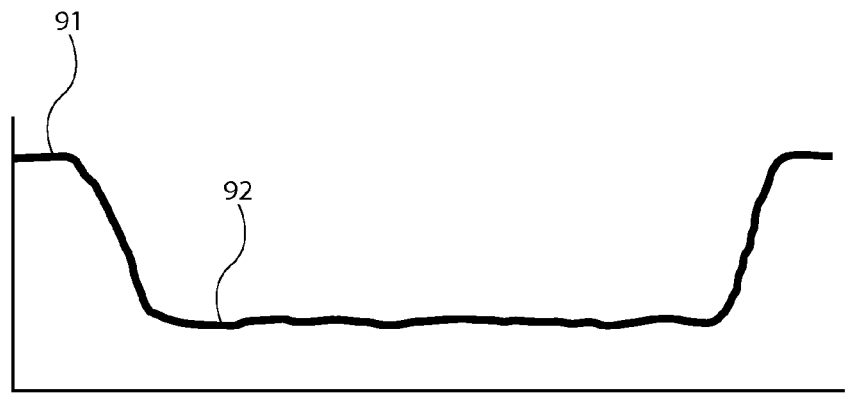
FIG. 6A is a graph of detected radiation when a load passes by a radiation detector system.
Figure 6B:
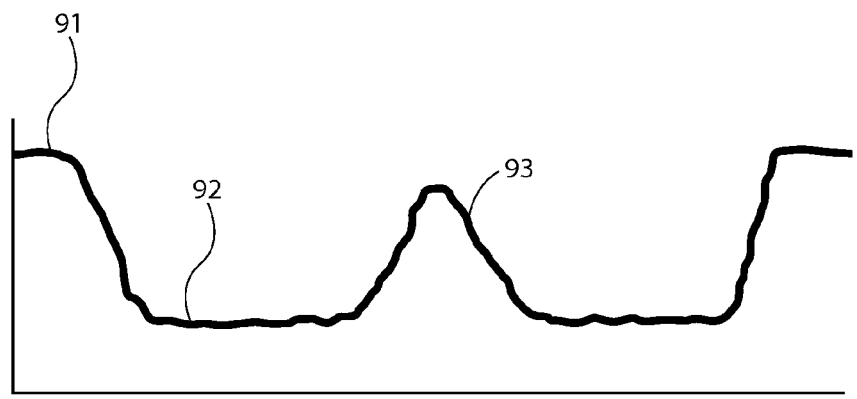
FIG. 6B is a graph of detected radiation when a load containing radioactive material passes by a radiation detector system.

The processor may also process the monitoring data to accommodate variations in the depth of material presented to the radiation detector system. The undesired radioactive material typically is low level radiation and may be buried deeply in a load of recycled material. As is known, the material presented to a radiation detector system may shield the background radiation from the detector resulting in a reduced measurement of background radiation, or background depression. The extent of background depression has been shown to be correlated with the amount of material presented to the radiation detector system, such as the depth of material in a truck, rail car, or other container. Conversely, when the depth of material is reduced, additional background radiation is permitted to reach the detector system resulting in a measurable increase in radiation incident on the detector. This increased measure of background radiation has at times been misinterpreted as indicating the presence of a low-level radioactive material in the recycled material being presented to the radiation detector. Referring to FIGS. 6A and 6B, two illustrative radiation measures are shown. The graph of FIG. 6A illustrates the effect of background depression observed when a load, such as a load of recycled steel scrap, passes by a radiation detector system. Before the scrap load is presented to the detector system the background radiation is measured at a first level 91. When the scrap load is presented, the load may shield a portion of the background radiation depressing the background to a second level 92. Referring to FIG. 6B, when the load contains a radioactive material an increase 93 in the measured radiation above the depressed background level 92 may be measured and detected. However a reduction in the depth or density of the load may allow increased levels of background radiation to reach the detector system producing an increase in the measured radiation that may be mistaken for a radioactive source in the scrap load being monitored. The radiation detector system may therefore be equipped with one or more sensors adapted to sense the amount of material being presented to the radiation detector to allowing processing to compensate for the depth of a scrap load. The sensor may detect the depth of the material, the weight and packing density of the material, or other parameters correlated with the shielding of background radiation. The processor may utilize the sensor data to compensate for the effect of background radiation depression and reduce the probability of false alarms as explained in more detail in U.S. Pat. No. 5,679,956. Alternatively, in situations where the background radiation is not depressed, the processor may also adjust the sensitivity of the radiation detector to better accommodate the expected radiation measurements.

Other techniques for processing the monitoring data from the radiation detection systems identifying low-level radioactive materials may also be employed. In one example, measurements of background radiation in two spectral regions of interest may be used to calculate a normalization constant to compensate for background radiation as is explained in more detail in U.S. Pat. No. 7,408,148. FIG. 8 illustrates a model radiation spectrum as may be measured by a radiation detection system, such as may be employed at a truck gate. The graph 110 depicts radiation counts on the Y-axis 111 as a function of gamma radiation energy on the X-axis 112. Two illustrative radiation energy spectra are shown including a normal background radiation spectrum 113 and a spectrum 114 indicating background depression as may be caused by the presence of a large load of steel scrap.

As shown in FIG. 8, the measured radiation spectrum may be segmented into two or more increments or segments 115 representing portions of the measured spectrum. A first increment may be selected to include detectable emissions from a relevant radiation source and a second increment may be selected to substantially exclude detectable emission from a relevant radiation source. A measurement of background radiation may be obtained in the absence of a relevant radiation source for each of the first and second increments, and the background measurements processed to compute a calibration factor. When material that may include a potential radioactive source, such as a load of steel scrap, is presented to the radiation detector radiation measurements may be recorded for each of the first and second spectral regions of interest. The radiation measurements may reflect background depression due to shielding of background radiation from the detectors by the material. The processor may apply the previously computed calibration factor to compensate for the effect of background depression and thereby improve the ability of the radiation detector to properly identify relevant radioactive materials in defined regions of interest as explained in U.S. Pat. No. 7,408,148.

The central system for monitoring radiation levels may also be capable of generating one or more alarms. The system may include speed detector systems to monitor the rate at which material is presented to a radiation detector. Many radiation detectors require material to be presented no faster than a certain speed to ensure adequate exposure time for the radiation measurements. As such, the system may be adapted to generate a speed alarm if material is moved too quickly for the radiation detector to generate an accurate and reliable measurement. When a speed alarm is generated, the material may be presented to the radiation detector system again to permit a proper measurement. For example, a truck carrying a load of steel scrap may be required to drive between panels of a radiation detector at a slower speed.

The central system for monitoring radiation levels may receive and store data from a plurality of radiation detectors at a plurality of facilities. In some embodiments, it may be desired to analyze the data collected from one or more detectors, or to compare data from one or more detectors throughout the network of facilities and detectors. The system may include a database for storing the collected data and an analysis engine capable of analyzing the collected data. Analyzing the data may include statistical or other analysis and may include generating reports regarding the operation of the system. The system may also include a portal, such as a web-portal, allowing one or more users to access the collected data and perform the analysis. The collected data may include processed or unprocessed measurement data from the radiation detectors, and may include data on alarms generated and the disposition of material associated with the alarms. For example, a user utilize the web-portal to generate a report of all alarms generated at the managed facility. Another user may access the web-portal to generate a report of all alarms generated throughout the network of facilities monitored. It may also be desired to generate reports identifying the frequency of alarms, such as a percentage of loads processed, to compare the relative performance of two or more facilities. The collected data may also include information corresponding to a operational status of the radiation detectors, and a user may access the web-portal to generate a report identifying the health status of the detectors. The analysis engine may also allow users to analyze the performance of certain detectors, certain facilities, or the network of facilities over time. By providing convenient access to the collected data and a consistent reporting methods, the system may provide methods for monitoring, identifying and diagnosing potential problems that were previously unavailable.

Referring generally to FIGS. 9 and 10, two exemplary reports are illustrated that include information such as that previously discussed. For example, FIG. 9 represents a report summarizing data from a plurality of facilities. The data in FIG. 9 includes facility or site location, and for each facility the number of alarms generated by type as well as the alarm accept rate. FIG. 10 illustrates an excerpt of a report that summarizes data for each detector location in each of the selected facilities represented on the report. For example, Location #1 has five detector locations or portals. For each portal, the total number of occupancies and the number of gamma alarms generated from received scrap (i.e. gamma scrap) are reported. A metric of the detector health is report as a percent degradation of the system.

Referring generally to FIGS. 2 through 5, a plurality of radiation detector systems may be located at a plurality of locations throughout a network of steelmaking facilities. Steelmaking facilities use steel scrap as a raw material for the steelmaking process. The steel scrap may be received from multiple scrap dealers or suppliers who have collected scrap steel from a wide variety of sources. A load of steel scrap may contain undesired low-level radiation sources capable of contaminating a steelmaking facility, and it is desired to detect and exclude these undesired radiation sources at the earliest opportunity to reduce cost.

Figure 2:
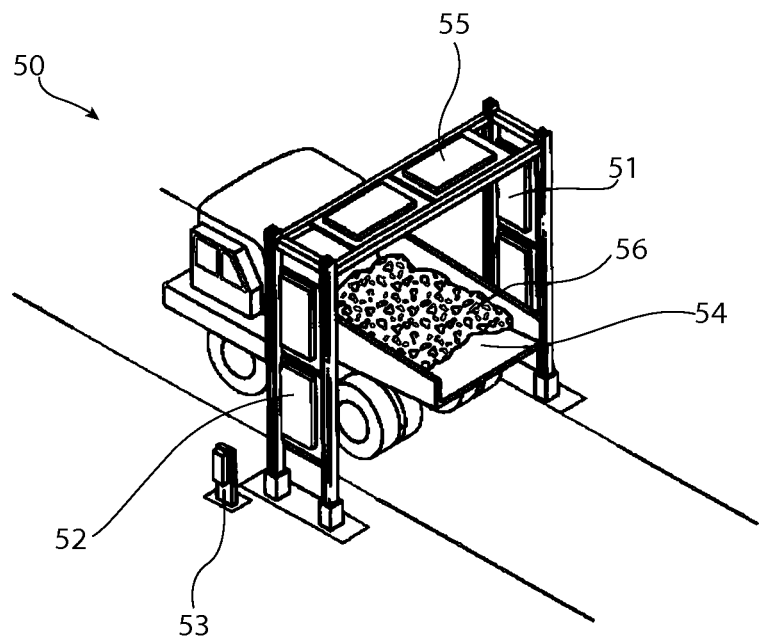
FIG. 2 is a perspective view of radiation detectors used with a truck gate.

A steel scrap load may enter a steelmaking facility through a truck gate which may include a radiation detection system. One example of such a truck gate is illustrated in FIG. 2. The truck gate 50 may be positioned at or near the entrance to the steelmaking facility where steel scrap loads are to be received. The gate may span a road or other pathway to facilitate movement of trucks delivering loads of steel scrap to the steelmaking facility. The gate 50 may include a radiation detection system including one or more radiation detectors, such as scintillation detectors. As shown in FIG. 2, a truck 54 may transport a steel scrap load 56 between radiation detectors 51, 52 positioned on either side of a road. The radiation detector systems 51, 52 may include scintillation detectors. The radiation detector system systems 51, 52 may be elevated above the surface of the road to correspond with the position of the load of steel scrap 56 carried by the truck 54. A radiation detection system at a truck gate 50 may also include radiation detector system 55 positioned above the roadway such that a truck must pass underneath the detector. The load of steel scrap in the truck may tend to shield radiation sources reducing the ability to detect sources from one or more directions. Providing radiation detector systems on either side and above the scrap load may improve the probability of detecting a partially shielded radiation source. The radiation detection system may also include control unit 53 adjacent the detection system. The control unit 53 may provide the ability to configure, diagnose, or otherwise operate the radiation detection system.

When a truck delivering a load of steel scrap passes through the gate 50, the radiation detectors measure incident radiation from the steel scrap load in the truck. Various alarms may be generated. A speed alarm may be generated if the truck is driven too quickly through the gate, and the truck may be required to pass through the gate at a slower speed. Radiation alarms may be generated if a measured radiation level exceeds predetermined criteria. As previously discussed, the measured radiation may be processed to compensate for the effects of background radiation and background depression when the truck or scrap load shields background radiation from the radiation detectors.

If the scrap load in the truck contains a radioactive source as indicated by the measured radiation, an alarm may be generated. An alarm triggered based upon the presence of radiation may be referred to as a radiation or gamma alarm. Radiation alarms may be generated either locally by the radiation detection system and processor or remotely by the central monitoring station. In any case, the radiation alarm is communicated both to the central monitoring station and to the steelmaking facility where the radiation source has been detected. The central monitoring station may analyze the radiation alarm and determine the appropriate action, such as rejecting the load of steel scrap and returning the steel scrap to the vendor. Alternatively, the load of scrap steel may be removed from the truck and searched to identify and remove the radioactive material.

When radioactive material is identified in a load of scrap or other materials, before the load of scrap containing the radioactive source may be returned certain governmental approvals may be required associated with the shipment of radioactive materials. In some jurisdictions, each detected radioactive material may need to be reported and an exemption requested, such as from the federal or state Department of Transportation. The report and request for exemption may require the submission of data associated with the origins of the radioactive material and the measurement data used to identify or characterize the source of the radiation. The format and content of one such report has been standardized as ANSI N42.42, the contents of which are incorporated herein by reference. The ANSI standard specifies the XML data format that is may be used for data made available by radiation measurement instruments, such as the plurality of radiation detectors. The system may include, centrally or regionally, or locally at each detector, a report generator configured to create the required report and exemption request required for the re-shipment of a load identified as containing radioactive material. The required report and exemption request may be generated automatically upon request by a user. In other embodiments, the report and exemption request may be generated automatically upon detection of radiation alarm. The report may contain at least the information required by the ANSI N42.42 standard and may include additional information that may have utility for the governmental agency and/or the facility. The system may also include a report generation tool configured to prompt a user to enter the required information so that a complete report and exemption request may be generated by the system. The system may also be capable of communicating the report and exemption request to the appropriate authorities, and may provide a copy of the report to one or more users, such as an environmental manager for the facility or company where the radiation source was identified. In this manner, the system may streamline the reporting process improving the efficiency of the facility in processing identified radioactive materials and reducing errors that may delay submission of the report and exemption request.

In addition to truck gates, steelmaking facilities may receive loads of steel scrap by railroad or other appropriate containers of transportation. A radiation detection system may be provided at a rail gate or railroad entrance to a steelmaking facility, and may be operated similarly to the truck gate previously discussed. As will be apparent, each radiation detection system must be installed and configured to accommodate the specific requirements of the installation site.

Figure 3:
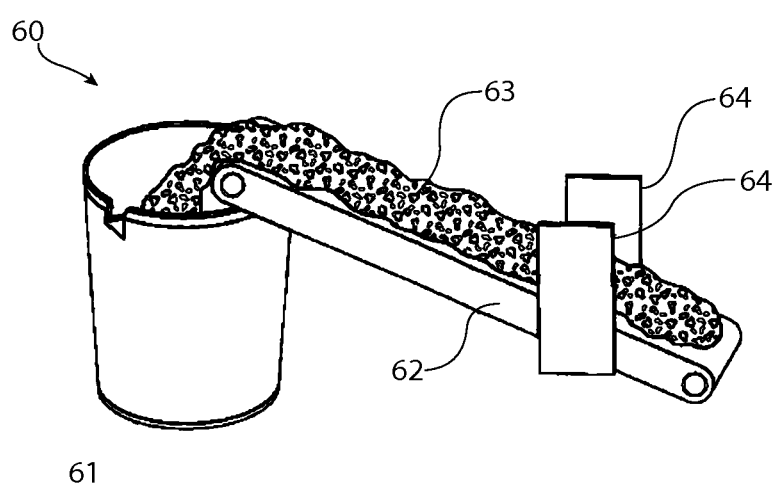
FIG. 3 is a perspective view of radiation detectors used with a charge bucket conveyor.

Radiation detection systems may also be located at other locations through a steelmaking facility to reduce the likelihood of melting a radiation source in a steelmaking furnace. In steelmaking using electric arc furnaces, scrap steel is often loaded into a charge bucket and then transferred from the charge bucket to the electric arc furnace. As shown in FIG. 3, radiation detectors 64 may be located near a conveyor 62 supplying scrap metal 63 to a charge bucket 61. In some installations, steel scrap 63 has been loaded onto a conveyor 62 for transportation to a charge bucket 64. The charge bucket 64 then transfers the steel scrap to a furnace, such as an electric arc furnace to be melted into molten steel. Due to the risks associated with melting radiation sources and the potential contamination of the steelmaking facility and steel products produced, radiation detector systems 64 may be provided to detect radiation in the steel scrap on the conveyor. The radiation detector systems 64 may be positioned on either side of the conveyor 62 such as is shown in FIG. 3. The radiation detector systems may also be positioned above or below the conveyor as desired to achieve reliable detection. As steel scrap is separated and loaded onto the conveyor, the potential for the steel scrap to shield radioactive material from a detector is reduced and the probability of detecting a radiation source prior to melting in a furnace is increased.

Figure 4:
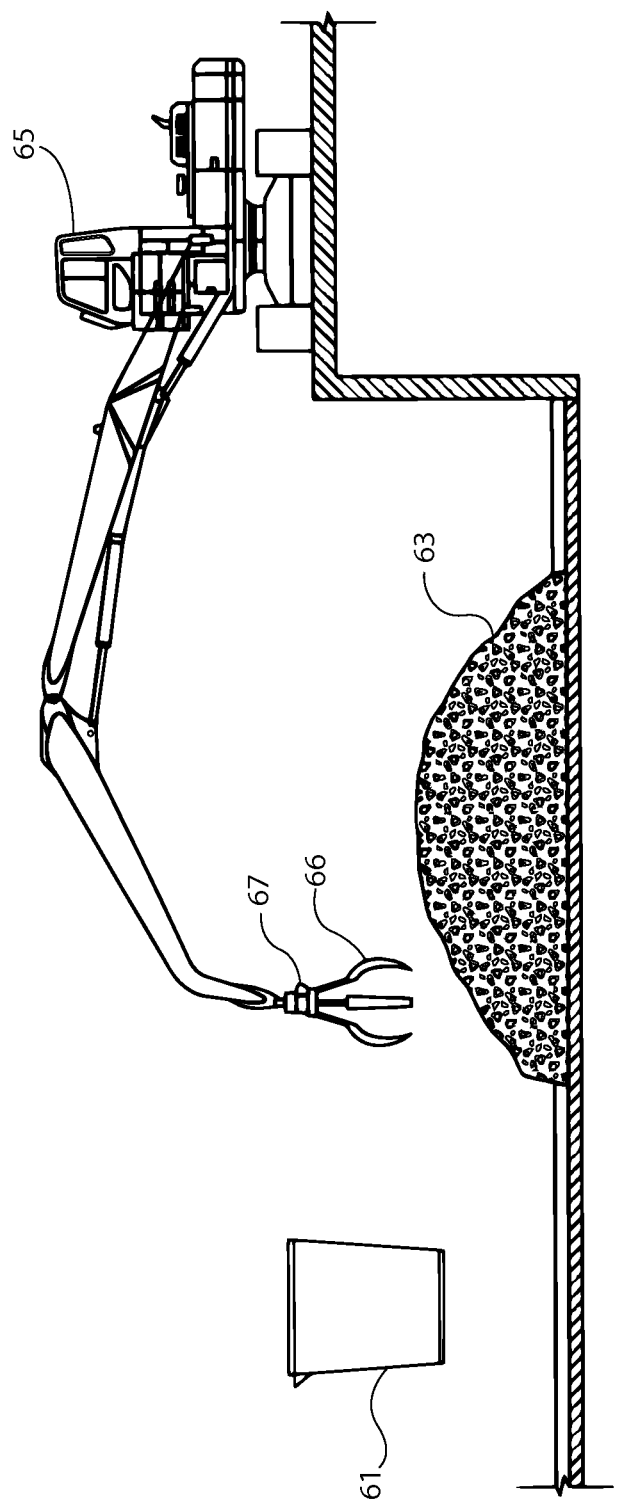
FIG. 4 is a perspective view of radiation detectors used with a charge bucket loader.

A radiation detection system may also be used with other methods of loading a charge bucket. As shown in FIG. 4, for example, a charge bucket 61 may be loaded using a crane 65 or other device equipped with an electromagnet, clam shell, or grapple 66 capable of securing steel scrap 63 for transportation to the charge bucket 61. Similar to the conveyor system 60 illustrated in FIG. 3, radiation detectors 67 may be provided near the grapple 66 or other attachment for securing steel scrap 63 to detect radioactive materials prior to loading into the charge bucket 61 and melting in a furnace. In some installations, a wireless communication system may be provided to enable the radiation detection system to communication with a processor and central monitoring station without the need for additional cabling attached to the radiation detector. The separation of the steel scrap that occurs during the loading process similarly increases the likelihood of radioactive materials being exposed and detected by the radiation detectors. If a radioactive material is detected, a radiation alarm may be generated and the identified material may be quarantined until the radioactive material is identified and removed or other determination is made for the disposal or processing of the steel scrap.

While a central system of monitoring radiation may reduce the risk of radioactive material reaching a steelmaking furnace and being melted, radiation detectors may also be provided at locations downstream from the melting operation to identify undesired radiation in the molten steel, emissions, and steel products. After melting in a furnace, such as an electric arc furnace, the molten steel may be sampled at various times to assess metallurgical properties of the molten steel prior to forming steel products. The samples of the molten steel, known as lollipops, may be presented to a radiation detector to verify that no radioactive material was melted and included in the molten steel. If the molten steel contains undesired radioactive material, the steelmaking facility may take appropriate steps to limit any further contamination. Radiation detection systems may be selected for monitoring small samples of molten or semi-solid steel product. As with the detector systems previously discussed, the radiation detector systems may communicate monitoring data to a processor and communicate with a central monitoring station.

Figure 5:
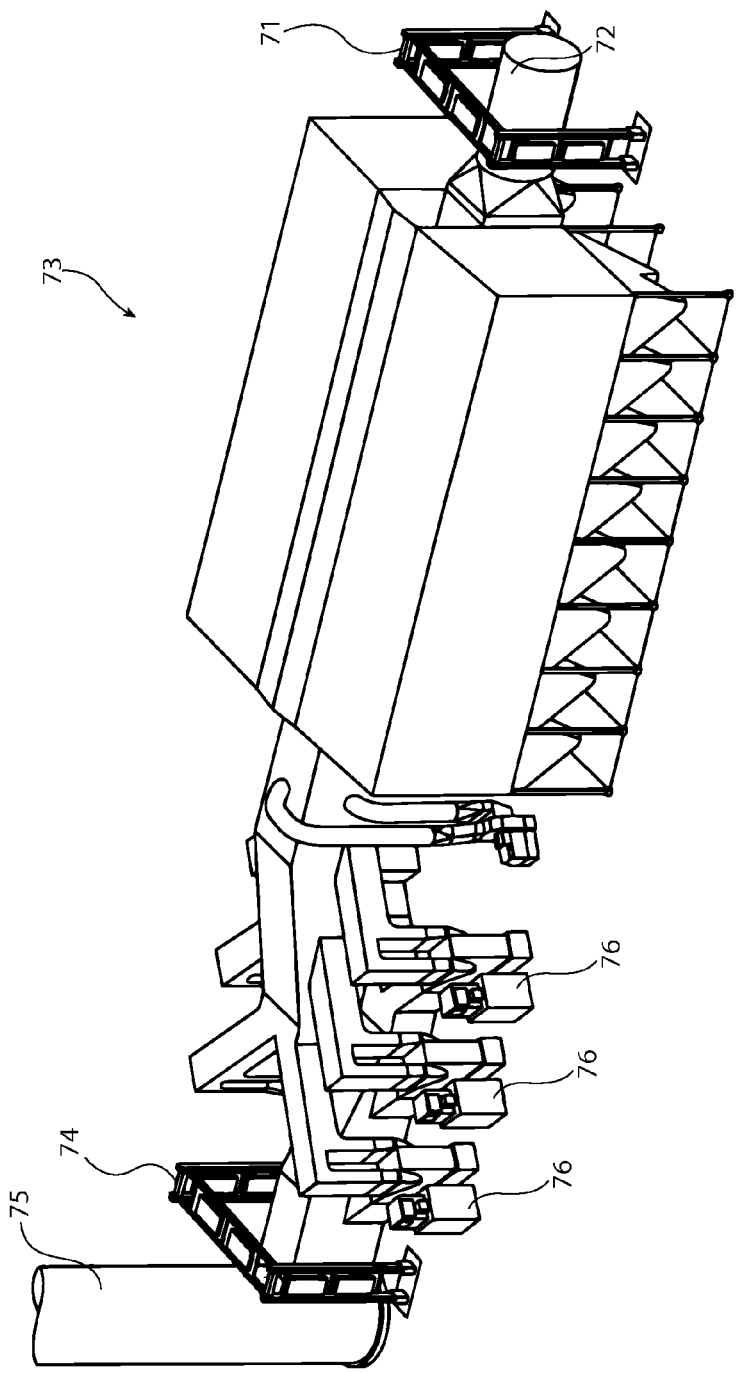
FIG. 5 is a perspective view of radiation detectors used with a baghouse.

In addition to radiation in the molten steel, steelmaking facilities may also desire to monitor particulate and other emissions for the presence of radiation. As shown in FIG. 5, a radiation detection system 71 may be provided at the entrance 72 to a baghouse 73 or other particulate collection system. The entrance 72 may be ducting adapted to communicate particulate matter and other emissions from one or more furnaces to a particulate collection system. The particulate matter and emissions may be drawn through the baghouse by induced draft fans 76. Additionally, a radiation detection system 74 may be provided near an exhaust stack 75 to monitor radiation in exhaust gases released through the stack 75. The radiation detection systems 71, 74 may operate with a processor and be adapted to communicate with the central monitoring station as previously described.

As a further safe guard against radioactive steel product leaving a steelmaking facility, a radiation detector may be provided to detect radiation in product exiting a steelmaking facility. For example, a rail gate or truck gate, such as is illustrated in FIG. 2, may be used to detect radiation in steel product carried on trucks exiting the facility. Alternatively a radiation detector system may be integrated into a convenient location within the steelmaking facility after the steel product is formed to monitor radiation while avoiding interruption of the standard production processes of the facility.

As will be apparent, radiation detector systems may be provided at one or more locations within a steelmaking facility, and at one or more steelmaking facilities in a network. The radiation detector systems may be of the same or different types, and may be provided by one or more vendors. The plurality of radiation detector systems communicates with the central monitoring station to provide comprehensive and consistent monitoring of radiation throughout the network of steelmaking facilities.

The central monitoring system also may be employed with radiation detector systems at locations other than steelmaking facilities. For example, a plurality of radiation detector systems may be located at a plurality of steel scrap processors. As previously discussed, steel scrap processors, such as dealers and vendors, acquire steel scrap and supply steel scrap to steelmaking facilities. A radiation detector system may be provided at a receiving location of a scrap processor to identify and exclude scrap containing radioactive materials. Alternatively, a scrap processor may pay a reduced rate for scrap containing radioactive material to offset the cost of sorting the scrap to remove the radioactive material. Scrap processors often sort and shred steel scrap. Radiation detectors may be provided at the sorting and shredding operations where the scrap is less likely to shield a radioactive source from detection. Additionally, a radiation detector system may be provided at the exit or shipment location, such as a truck gate, to screen steel scrap prior to leaving the scrap yard. If a radioactive source is identified prior to shipping the scrap to a steelmaking facility or other customer, the radioactive material may be removed avoiding the cost and delay associated with the steelmaking facility or customer identifying the radiation, rejecting the load of scrap, and returning the scrap to the scrap processor.

In one example, the central system of monitoring radiation may comprise radiation detection systems located at both steelmaking facilities and at steel scrap processors providing steel scrap to the steelmaking facilities. The central monitoring station may be adapted to compare radiation measurements of specific scrap loads upon leaving the scrap processor and upon arriving at a steelmaking facility to verify that no radioactive material was introduced to the scrap load during transport to the steelmaking facility. In some examples, the network of steelmaking facilities may include one or more steel scrap processors providing steel scrap to the steelmaking facilities and the central monitoring station may be adapted to analyze the radiation measurements of a given scrap load throughout the scrap processor and steelmaking facility.

The central system of monitoring radiation may be utilized in any application where it is desired to employ a plurality of radiation detection systems at a plurality of facilities, such as detecting radiation in cargo at shipping ports, airports, or at multiple locations throughout a metropolitan area.

The central system of monitoring radiation also comprises a central monitoring station in communication with the plurality of radiation detection systems. The central monitoring station may be adapted to receive monitoring data from the radiation detectors over the internet or other appropriate communication channel. The central monitoring station may be located at a different location than the production facilities being monitored or may be collocated with one of the production facilities. Additionally, the central monitoring station may be accessible entirely through the internet such that a physical station is not required. In one implementation, the central monitoring station may be fully operational from two or more separate locations. Having separate locations may reduce the probability of the central monitoring station being out of service in the event of a power outage or other service interruption at one location.

The central monitoring station may trigger alarms both at the central monitoring station and at the production facility, such as a steelmaking facility, when the detected radiation exceeds an established threshold. The threshold may be established by the central monitoring station to correspond with the identification of an undesired or impermissible radiation source. A standard threshold may be set by the central monitoring station for all of the radiation detectors in a network or a separate threshold may be established for each or selected groups of radiation detectors. For example, in a steelmaking facility, the truck gate radiation detectors may be configured with a first threshold setting while the conveyor or charge bucket radiation detectors may be configured with a different threshold setting. Additionally, different thresholds may be established for different segments of a radiation spectrum. In one example, a threshold may be established to generate an alarm indicating the presence of undesired radioactive materials, while a different threshold may be established to indicate the presence of excessive background radiation. The system may also trigger an alarm based upon excessive background or naturally occurring radiation as such excess radiation may indicate a problem with the radiation detection system or other unexpected condition warranting attention.

The central monitoring station may receive processed data from the radiation detection systems and processors in the system. The central monitoring station may also be adapted to receive unprocessed measurement data from the radiation detectors, or additional information to identify and analyze a potential radiation source. For example, the central monitoring station may be adapted to receive a radiation spectrum indicating the amount of radiation in each increment of the spectrum over a given time interval. The central monitoring station may then use the data, such as the radiation spectrum, to determine whether an alarm generated by the system represents actual radioactive material or whether an alarm may be a false alarm triggered by fluctuations in background radiation or other sources.

In the event of an alarm, the central monitoring station may determine a corrective active and provide instructions to a local radiation safety officer or other qualified personnel. When the central monitoring station determines that an alarm represents radioactive material in a load of steel scrap or other material, the central monitoring station may instruct a local radiation safety officer or other qualified personnel on the proper disposition of the load. The central monitoring station may reject the load in its entirety and require that the load be returned to the supplier, such as a scrap metal dealer. If the radiation is dispersed throughout the load, the entire load may unusable by a steelmaking facility. If the radioactive source is well defined, searching the load may be more cost effective than rejecting the load. The central monitoring station may permit the local personnel to search the load for the radioactive material and remove the radioactive material from the load.

After an alarm is generated, the load of material may not be used until approved by the central monitoring station. The central monitoring station may serve as an independent evaluator of the presence of radioactive material and thereby improve the reliability of detection. The central monitoring station may also be responsible for the cost of remediation, thereby providing an incentive for the central monitor to prevent radioactive material from entering a production facility such as a steelmaking facility. When approval from a central monitoring station is required to clear an alarm, local variation in operations and procedures may be reduced or eliminated.

The central monitoring station may establish standards for each radiation detector or facility. Each radiation detector at each facility in a network may be configurable to accommodate variations in the local environment or operating conditions. These settings may be configurable through software and may be remotely set or changed. A change to the configuration or settings of a radiation detector may thus impact the reliability and accuracy of the detector. The central monitoring station may remotely set or change the settings and configurations of the radiation detectors according to criteria established for the network of facilities. Additionally, a security system may be incorporated preventing changes to the radiation detectors that are not authorized by the central monitoring station. If settings are changed locally, the central monitoring station may be adapted to detect the change and either correct the setting or trigger an alarm to prevent the radiation detector from being used until the configuration is brought into compliance with the standard configuration established by the central monitoring station.

The central monitoring station may also monitor the radiation detectors for proper operation. The radiation detectors employed throughout the system may generate diagnostic information useful for assessing the proper operation of the detectors. For example, some scintillation detectors provide two light sensors and compare the counts recorded by each sensor. A discrepancy in the counts recorded by the two sensors may indicated a fault condition in the radiation detector. Other conditions such as high or low voltages, or power line faults may also be detected and reported as diagnostic information. The diagnostic information may be communicated to the central monitoring station.

The central monitoring station may interrogate the radiation detection systems for diagnostic information on a continuous or periodic basis. Alternatively, the radiation detection systems may report an operating status including diagnostic information to the central monitoring station. In this fashion, the central monitoring station may monitor the radiation detectors for proper operation on an ongoing basis. This ongoing monitoring may limit the opportunity for a faulty radiation detector to go unnoticed allowing radioactive material into a production facility. The central monitoring station may also be capable of remotely resetting the radiation detectors to resolve certain problems without requiring a technician to visit the radiation detector. The central monitoring station may also be capable of providing software or firmware updates to the radiation detectors to improve operation or functionality, or to resolve specific problems identified in the diagnostic information.

The diagnostic information received from the radiation detectors may be used to predict or identify maintenance opportunities for the radiation detectors at the plurality of facilities. The central monitoring station may receive and store diagnostic information in a database. The stored diagnostic information may be statistically analyzed to identify standard operating ranges for various parameters of the detection equipment. The analyzed data may then be used to identify radiation detectors having a change in their operating status, even if the radiation detector is still operating properly. A change in operating status may indicate a potential or developing problem with the radiation detector and a warning or alert may be generated to prompt further inquiry. For example, a warning may be generated when diagnostic information from a radiation detector indicates some aspect of the detector is operating outside of a statistically significant range. In some instances, the diagnostic information may be used to identify opportunities for preventative maintenance or proactively schedule repairs before a radiation detector becomes inoperative interfering with productive operations at the facility. The central monitoring station may aggregate and analyze data from each radiation detector in the network as well as from portions or all of the radiation detectors in the network. A system wide view of the health of the radiation detectors may thus be provided allowing repairs and maintenance to be conducted to minimize disruptive impact on the network of facilities.

The central system of monitoring radiation at a plurality of facilities may prevent radioactive materials from entering the facilities. The central system may also collect information on the effectiveness of the radiation detection systems and enable calculation of a probability that a potential radiation source may escape detection and enter a given facility. If an undesired radioactive material enters a facility, remediation may be required. The cost of remediation varies according to the nature of the radioactive material and where the material is identified. To mitigate the financial consequences of radioactive material entering a facility, an insurance policy may be provided to compensate the facility for at least a portion of the cost of remediation. Additionally, the insurance policy may be provided to compensate the central monitoring station for a loss incurred by any of the facilities in the network of facilities being monitored. The central system of monitoring radiation may provide information not previously available to value an insurance policy to economically and efficiently allocate risk.

The central monitoring station may have an insurable interest. By monitoring the operation of radiation detectors throughout a network of facilities, the central monitoring station may acquire substantial data on the frequency with which radioactive sources are received at the facilities and detected by the radiation detection equipment. Additionally, when multiple radiation detectors are located at a given facility, the central monitoring station may determine the effectiveness of a first radiation detector, such as at a truck gate, based upon the number of radioactive sources identified at a second radiation detector, such as utilized with a charge bucket system. A radioactive source identified by a second radiation detector may indicate a failure of the first radiation detector to identify the radioactive source and indicate a need for improved processes or procedures at the facility. This data collected by the central monitoring station may be analyzed to assess the total risk to the network of facilities posed by radioactive materials received in recycled materials.

An underwriting premium for an insurance policy may be established prior to implementation of a central system of monitoring radiation based upon expected risks and potential losses. The central system of monitoring radiation however may collect data permitting more accurate assessments of the risks and possible financial losses and thereby allow a more accurate premium to be established. The central monitoring facility and the facilities in the network may both have an insurable interest protected by an insurance policy, and the policy may be designed to compensate either, the central monitoring station, the facility or both without allocation of fault.

The central system of monitoring radiation at a plurality of facilities may utilize the radiation detectors to both monitor radiation and to quantify the risk of a radioactive source being undetected. Continuous functioning and monitoring of the radiation detectors for proper operation may improve the reliability of the system and thereby reduced the risk of loss resulting in lower insurance premiums. The use of continuous monitoring to more accurately assess and value insurance risks may be computed by a variety of methods including those disclosed in U.S. Pat. No. 7,610,210. For example, the monitoring data from the radiation detectors may be collected and transmitted to a central monitoring station for analysis to determine whether the radiation detectors are operating within acceptable standards. The standards may be developed theoretically, empirically using data collected from the network of facilities or other similar facilities, or through a combination of techniques. The central monitoring station may generate reports containing summaries of the collected data to facilitate analysis of the radiation monitoring and of the risks associated with the network of facilities.

A method of monitoring radiation levels in production facilities may comprise providing a plurality of radiation detection systems capable of detecting radiation levels in recycled material positioned at desired locations through a plurality of production facilities, providing a central monitor in communication with the plurality of radiation detection systems, analyzing the data from the radiation detection systems to determine the nature of a potential radiation source, communicating data from the radiation detection systems to the central monitor corresponding to detected radiation levels, disposing of the recycled material containing potential radiation sources according to instructions provided from the central monitor based upon the analysis of the data from the radiation detection systems, and monitoring the operation of the plurality of radiation detection systems from the central monitor and signaling the facility when a radiation detection system requires maintenance. The method of monitoring radiation may be used in connection with recycled materials such as steel scrap for steelmaking facilities, aluminum scrap for aluminum production facilities, and various other production facilities utilizing recycled materials.

The method of monitoring radiation levels in production facilities may also include calculating a probability that a potential radiation source will escape detection and contaminate a production facility, calculating an estimated cost for remediation of a contaminated production facility, and providing an insurance policy to compensate the production facility for at least a portion of the cost of remediation. Previously each production facility may have operated independently from other production facilities. The independent operation may have resulted in variations in the procedures used and consequently the probability of detecting a potential radioactive source may have been variable between facilities and even between different operators of a given facility. The systems and methods disclosed herein may reduce variation allowing for a more accurate risk assessment and a more efficient determination of insurance premiums. The insurance may insure a specific facility, a network of facilities, a central monitor or monitoring station, or various combinations against the risk of loss associated with radioactive material entering a facility. The method of monitoring radiation may further comprise requiring approval from the central monitor after an alarm has been triggered before the recycled material containing the potential radiation source may be processed, and providing an insurance policy to compensate the facility for at least a portion of the cost of remediation in the event of contamination of the facility by a radioactive material. In one example, the central monitoring station may be primarily responsible for monitoring and evaluating potential radiation sources and approval from a central monitor may be required before a local radiation safety officer or other qualified personnel at a facility may dispose of or otherwise process a load of material that triggered a radiation alarm.

While certain embodiments have been described, it must be understood that various changes may be made and equivalents may be substituted without departing from the spirit or scope of this disclosure. In addition, many modifications may be made to adapt a particular situation or material to the teachings of the disclosure without departing from its spirit or scope.

What is claimed is:

1. A central system of monitoring radiation levels in a plurality of facilities at the same time comprising:
   a plurality of radiation detection systems capable of detecting radiation levels in recycled material positioned at a plurality of locations through a network of facilities,
   at least one processor to process monitoring data generated by each of the plurality of radiation detection system to compensate for naturally occurring radiation and communicating compensated radiation levels, a central monitoring station capable of receiving data from the processor and identifying radioactive material in the recycled material at each radiation detection system, and the central monitoring station capable of generating an alarm at the central monitoring station and at the facility involved where an undesired radiation level has been recorded by at least one radiation detection system.

2. The central system of monitoring radiation levels in a plurality of facilities at the same time as claimed in claim 1 where the radiation detection systems comprise scintillation detectors counting radiation incidents in an energy spectrum.

3. The central system of monitoring radiation levels in a plurality of facilities at the same time as claimed in claim 1 where the central monitoring station is capable of monitoring the radiation detection systems for proper operation of the radiation detection systems.

4. The central system of monitoring radiation levels in a plurality of facilities at the same time as claimed in claim 3 where the central monitoring station is capable of interrogating the radiation detection systems for proper operation.

5. The system of monitoring radiation levels in a plurality of facilities at the same as claimed in claim 3 where the radiation detection systems are capable of reporting their operating status to the central monitoring station.

6. The central system of monitoring radiation levels in a plurality of facilities at the same time as claimed in claim 1 where the central monitoring station is capable of performing diagnostics on the radiation detection systems for proper operation of the radiation detection systems.

7. The central system of monitoring radiation levels in a plurality of facilities at the same time as claimed in claim 1 where the central monitoring station is capable of configuring at least some of the radiation detection systems to change radiation detection levels as desired.

8. The central system of monitoring radiation levels in a plurality of facilities at the same time as claimed in claim 1 where the central monitoring station is capable of setting threshold radiation levels in each radiation detection system corresponding to a threshold undesirable radiation level.

9. The central system of monitoring radiation levels in a plurality of facilities at the same time as claimed in claim 1 where the central monitoring station is capable of selectively aggregating and analyzing data from different radiation detection systems.

10. The central system of monitoring radiation levels in a plurality of facilities at the same time as claimed in claim 1 where the processor analyzes the monitoring data from each radiation detection system by dividing the spectrum of the data into increments with suspected radioactive material in desired increments.

11. The central system of monitoring radiation levels in a plurality of facilities at the same time as claimed in claim 10 where the increments correspond to at least cobalt, cesium, and radium.

12. The central system of monitoring radiation levels in a plurality of facilities at the same time as claimed in claim 1 where the processor analyzes the monitoring data from each detector system by segregating the spectrum of the data into increments and normalizing each segment based on the difference in counts between said increments.

13. The central system of monitoring radiation levels in a plurality of facilities at the same time as claimed in claim 12 where potassium response is monitored and used to calibrate the radiation detector system.

14. The central system of monitoring radiation levels in a plurality of facilities at the same time as claimed in claim 1 further comprises a plurality of processors, each processor configured to process monitoring data generated by at least a portion of the plurality of radiation detection systems.

15. The central system of monitoring radiation levels in a plurality of facilities at the same time as claimed in claim 1 where the alarm is selected from the group consisting of speed alarm, gamma alarm, NORM alarm, and false alarm.

16. The central system of monitoring radiation levels in a plurality of facilities at the same time as claimed in claim 1 where the processor compensates for variation in load levels of recycled material on passing through the radiation detection system.

17. The central system of monitoring radiation levels in a plurality of facilities at the same time as claimed in claim 1 where the processor is part of the central monitoring station.

18. A central system of monitoring radiation levels in a plurality of steelmaking facilities at the same time comprising:
a plurality of radiation detection systems capable of detecting radiation levels in scrap loads positioned at a plurality of locations through a network of steelmaking facilities,
at least one processor to process monitoring data generated by each of the plurality of radiation detection system to compensate for naturally created radiation and communicating compensated radiation levels,
a central monitoring station capable of receiving data from the processor and identifying radioactive material in scrap loads at each radiation detection system, and
the central monitoring station capable of triggering an alarm both at the central monitoring station and at the steelmaking facility involved where an undesired radiation level has been recorded by at least one radiation detection system.

19. The central system of monitoring radiation levels in a plurality of steelmaking facilities at the same time as claimed in claim 18 where the radiation detection systems comprise scintillation detectors counting radiation incidents in an energy spectrum.

20. The central system of monitoring radiation levels in a plurality of steelmaking facilities at the same time as claimed in claim 18 where the central station is capable of monitoring the radiation detection systems for proper operation of the radiation detection systems.

21. The central system of monitoring radiation levels in a plurality of steelmaking facilities at the same time as claimed in claim 20 where the central monitoring station is capable of interrogating the radiation detection systems for proper operation.

22. The central system of monitoring radiation levels in a plurality of steelmaking facilities at the same time as claimed in claim 20 where the radiation detection systems are capable of reporting their operating status to the central monitoring station.

23. The central system of monitoring radiation levels in a plurality of steelmaking facilities at the same time as claimed in claim 18 where the central monitoring station is capable of performing diagnostics on the radiation detection systems for proper operation of the radiation detection systems.

24. The central system of monitoring radiation levels in a plurality of steelmaking facilities at the same time as claimed in claim 18 where the central monitoring station is capable of configuring at least some of the radiation detection systems to change radiation detection levels as desired.

25. The central system of monitoring radiation levels in a plurality of steelmaking facilities at the same time as claimed in claim 18 where the central monitoring station is capable of setting threshold radiation levels in each radiation detection system corresponding to a threshold undesirable radiation level.

26. The central system of monitoring radiation levels in a plurality of steelmaking facilities at the same time as claimed in claim 18 where the central monitoring station is capable of selectively aggregating and analyzing data from different detector systems.

27. The central system of monitoring radiation levels in a plurality of steelmaking facilities at the same time as claimed in claim 18 where the processor analyzes the monitoring data from each radiation detection system by dividing the spectrum of the data into increments with suspected radioactive material in desired increments.

28. The central system of monitoring radiation levels in a plurality of steelmaking facilities at the same time as claimed in claim 27 where the increments include at least cobalt, cesium, and radium.

29. The central system of monitoring radiation levels in a plurality of steelmaking facilities at the same time as claimed in claim 18 where the processor analyzes the monitoring data from each detector by segregating the spectrum of the data into increments and normalizing each segment based on the difference in counts between said increments.

30. The central system of monitoring radiation levels in a plurality of steelmaking facilities at the same time as claimed in claim 29 where potassium response is monitored and used to calibrate the radiation detector system.

31. The central system of monitoring radiation levels in a plurality of steelmaking facilities at the same time as claimed in claim 18 further comprises a plurality of processors, each processor configured to process monitoring data generated by at least a portion of the plurality of radiation detection systems.

32. The central system of monitoring radiation levels in a plurality of steelmaking facilities at the same time as claimed in claim 18 where the alarm is selected from the group consisting of speed alarm, gamma alarm, NORM alarm, and false alarm.

33. The central system of monitoring radiation levels in a plurality of steelmaking facilities at the same time as claimed in claim 18 where the processor compensates for variation in load levels of recycled material on passing through the detractor system.

34. The central system of monitoring radiation levels in a plurality of steelmaking facilities at the same time as claimed in claim 18 where the processor is part of the central monitoring station.

35. A system of monitoring radiation levels in multiple steelmaking facilities comprising:
a plurality of radiation detection systems positioned at a plurality of locations through a plurality of steelmaking facilities capable of detecting radiation levels of potential radiation sources in steelmaking material,
a central monitoring station in communication with the plurality of radiation detection systems capable of receiving data from the radiation detection systems corresponding to radiation levels, and
the radiation detection systems capable of triggering an alarm both at the central monitoring station and at the steelmaking facility where an undesired radiation level has been recorded by at least one of the radiation detection systems.

36. The system of monitoring radiation levels in multiple steelmaking facilities as claimed in claim 35 where the central monitoring station is capable of statistically processing the received data from the radiation detection systems to identify low-level radioactive material in the steelmaking material.

37. The system of monitoring radiation levels in multiple steelmaking facilities as claimed in claim 35 where a processor analyzes monitoring data from the radiation detection systems by dividing the spectrum of the data into increments with suspected radioactive material in desired increments.

38. The system of monitoring radiation levels in multiple steelmaking facilities as claimed in claim 37 where the increments include at least cobalt, cesium, and radium.

39. The system of monitoring radiation levels in multiple steelmaking facilities as claimed in claim 35 where the monitoring data from each radiation detection system is processed by dividing the spectrum of the data into increments and adjusting each increment based on the difference in counts between said increments.

40. The system of monitoring radiation levels in multiple steelmaking facilities claimed in claim 35 where potassium response is monitored and used to calibrate the radiation detector system.

41. The system of monitoring radiation levels in multiple steelmaking facilitates claimed in claim 35 where the steelmaking facility is capable of rejecting steelmaking material because of a potential radiation source based on instructions from the central monitoring facility.

42. The system of monitoring radiation levels in multiple steelmaking facilities as claimed in claim 35 where the radiation detection systems comprise scintillation detectors.

43. The system of monitoring radiation levels in multiple steelmaking facilities as claimed in claim 35 where the data from the radiation detection systems comprises an energy spectrum corresponding to radiation incident upon the radiation detection systems.

44. The system of monitoring radiation levels in multiple steelmaking facilities as claimed in claim 35 where the central monitoring station is capable of setting a threshold radiation level corresponding to an undesired radiation level for each radiation detection system.

45. The system of monitoring radiation levels in multiple steelmaking facilities as claimed in claim 35 where the central monitoring station is capable of aggregating data from a plurality of radiation detector systems.

46. The system of monitoring radiation levels in multiple steelmaking facilities as claimed in claim 35 where the central monitoring station is in communication with each radiation detection system at a steelmaking facility and capable of providing instruction to an operator of the radiation detection system.

47. The system of monitoring radiation levels in multiple steelmaking facilities as claimed in claim 35 where the central monitoring station is capable of analyzing the energy spectrum and determining the composition of a radiation source in the steelmaking material.

48. The system of monitoring radiation levels in multiple steelmaking facilities as claimed in claim 35 where the central monitoring station is capable of instructing the steelmaking facility to reject a source of potential radioactive material.

49. The system of monitoring radiation levels in multiple steelmaking facilities as claimed in claim 35 where the central monitoring station is capable of monitoring the radiation detection systems for proper operation of the radiation detection systems.

50. The system of monitoring radiation levels in multiple steelmaking facilities as claimed in claim 49 where the central monitoring station is capable of interrogating the radiation detection systems for proper operation.

51. The system of monitoring radiation levels in multiple steelmaking facilities as claimed in claim 49 where the radiation detection systems are capable of reporting an operating status to the central monitoring station.

52. The system of monitoring radiation levels in multiple steelmaking facilities as claimed in claim 35 where the central monitoring station is capable of performing remote diagnostics on the radiation detection systems to determine proper operation of the radiation detection systems.

53. A method of monitoring radiation levels in production facilities comprising:
detecting radiation levels in recycled material at desired locations through a plurality of production facilities by a plurality of radiation detection systems,
communicating data corresponding to detected radiation levels from the radiation detection systems to a central monitor,
analyzing data from the radiation detection systems to determine the nature of a potential radiation source in the recycled material, and
disposing of recycled material containing a potential radiation source according to instructions provided from the central monitor based upon the analysis of the data communicated from the radiation detection systems.

54. The method of monitoring radiation levels in production facilities as claimed in claim 53 comprising the additional steps of:
monitoring the operation of the plurality of radiation detection systems from the central monitor and signaling the facility when a radiation detection system requires maintenance.

55. The method of monitoring radiation levels in production facilities as claimed in claim 53 comprising the additional steps of:
calculating a probability that a potential radiation source will escape detection and contaminate a production facility,
calculating an estimated cost for remediation of a contaminated production facility, and
providing an insurance policy to compensate the production facility for at least a portion of the cost of remediation.

56. The method of monitoring radiation levels in production facilities as claimed in claim 53 comprising the additional steps of:
requiring approval from the central monitor after an alarm has been triggered before the recycled material containing the potential radiation source may be processed, and
providing an insurance policy to compensate the facility for at least a portion of the cost of remediation in the event of contamination of the facility by a radioactive material.

57. A method of monitoring radiation levels in steelmaking facilities comprising:
detecting radiation levels in steelmaking material at desired locations through a plurality of steelmaking facilities by a plurality of radiation detection systems,
communicating data corresponding to detected radiation levels from the radiation detection systems to a central monitor,
analyzing the data from the radiation detection systems to determine the nature of the potential radiation source, and
disposing of steelmaking material containing a potential radiation source according to instructions provided from the central monitor based upon the analysis of the data communicated from the radiation detection systems.

58. The method of monitoring radiation levels in steelmaking facilities as claimed in claim 57 comprising the additional steps of:
monitoring the operation of the plurality of radiation detection systems from the central monitor and signaling a steelmaking facility when a radiation detection system requires maintenance.

59. The method of monitoring radiation levels in steelmaking facilities as claimed in claim 57 comprising the additional steps of:
calculating a probability that a potential radiation source will escape detection and contaminate a steelmaking facility,
calculating an estimated cost for remediation of a contaminated steelmaking facility, and
providing an insurance policy to compensate the steelmaking facility for at least a portion of the cost of remediation.

60. The method of monitoring radiation levels in steelmaking facilities as claimed in claim 57 comprising the additional steps of:
requiring approval from the central monitor after an alarm has been triggered before the steelmaking material containing the potential radiation source may be processed, and
providing an insurance policy to compensate the steelmaking facility for at least a portion of the cost of remediation in the event of contamination of the steelmaking facility by a radioactive material.

* * * * *